Aug. 29, 1950    W. I. RUYLE    2,520,511
PINLESS CLOTHESLINE
Original Filed July 19, 1947
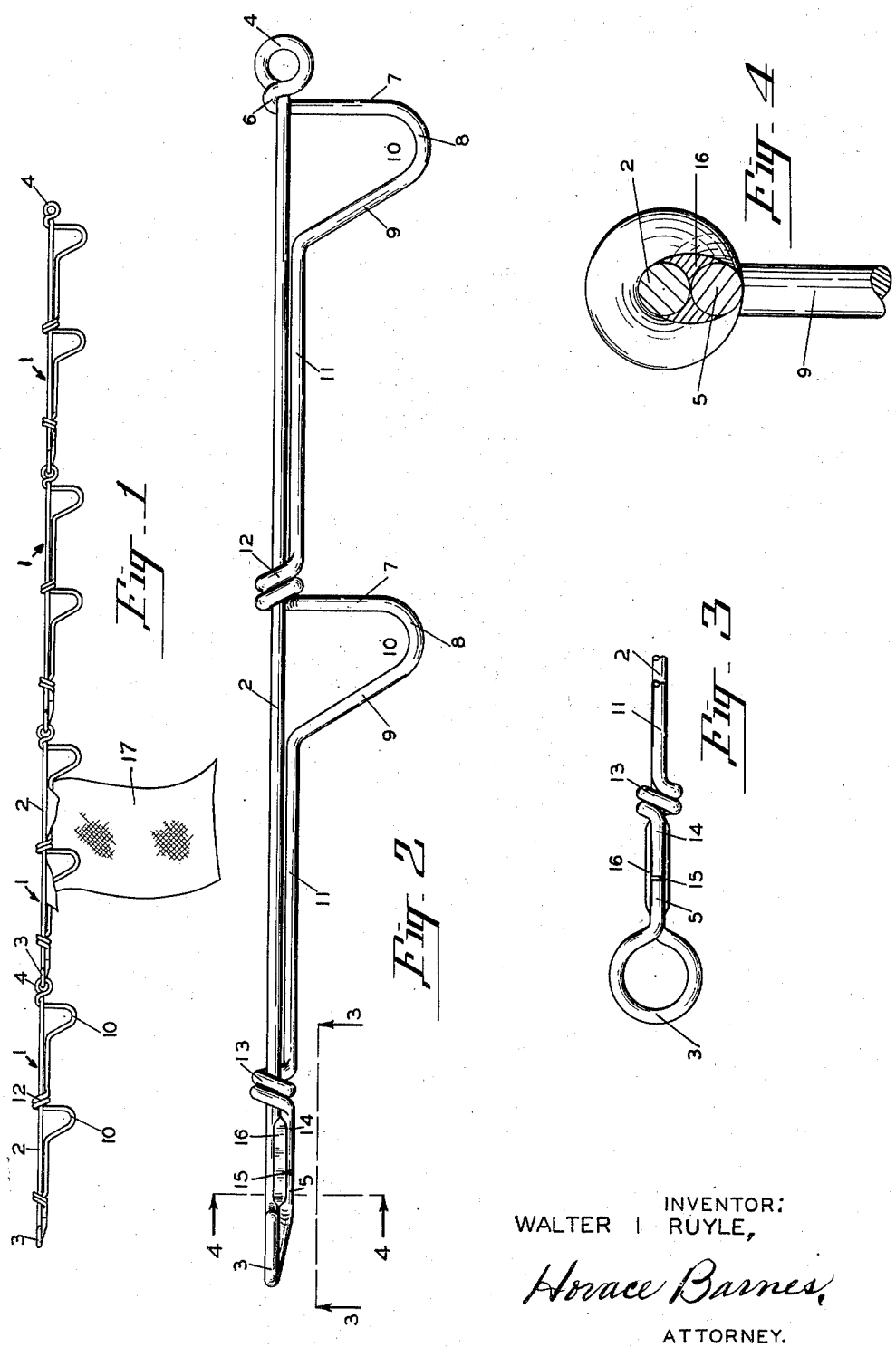
INVENTOR:
WALTER I RUYLE,
Horace Barnes,
ATTORNEY.

Patented Aug. 29, 1950

2,520,511

UNITED STATES PATENT OFFICE 2,520,511

PINLESS CLOTHESLINE

Walter Isaiah Ruyle, Salem, Oreg.

Substituted for application Serial No. 762,054, July 19, 1947. This application May 31, 1949, Serial No. 96,239

1 Claim. (Cl. 211—119.13)

This invention relates to improvements in clothes-lines of the pinless type.

This application is a substitute for application Ser. No. 762,054, filed July 19, 1947.

The principal object of the present invention is to provide an improved clothes-line formed of a plurality of interconnecting wire links of simple and practicable construction formed and combined to retain and support drying clothes without recourse to pins or other separable holding devices.

A further object of my invention is the provision of a clothes-line formed of linked members in which the ends of the several links formed of a single length of wire are disposed and secured in axial alignment and in abutting relation through the agency of a fused metallic medium whereby no projecting or unguarded ends exist or can work loose to endanger with tearing the suspended fabrics.

Other objects and advantages residing in my invention will be readily apparent in the course of the description to follow and will be pointed out in the appended claim.

In the accompanying drawing,

Figure 1 is a view in side elevation of a clothesline formed of a plurality of wire links embodying my invention.

Fig. 2 is a similar view of an individual link composing my improved line.

Fig. 3 is a partial view taken of one end of said link as from line 3—3 of Fig. 2.

Fig. 4 is an enlarged view in cross-section taken on line 4—4 of Fig. 2.

Referring to said views, I illustrate in Fig. 1 a clothes-line made in accordance with my invention consisting of a plurality of individual and identical links 1, 1, each of which is formed of a single length of wire of suitable gauge and characteristics of resilience and which may be readily obtainable in standard sizes and qualities.

The reference numeral 2 indicates the standing part of the several linked elements of my improved clothes-line which part extends in a straight line between its two terminal eyes 3 and 4, whereby as interconnected through the joining together of said eyes the associated links form a continuous clothes-line of indeterminate or any desired length. The co-axial arrangement of the series of standing parts 2 in the line affords a strong and substantially undeviating support for a quantity of drying clothes and which will withstand a considerable amount of tension either through the bearing of such weight or through the employment of suitable tensioning devices, not shown, at its extremities to counteract sagging.

Adjacent one end of the length of wire forming said links the eye 3 is formed, the extremity thereof being directed reversely in a relatively short portion 5 extended in parallel lines to the standing part 2 and in close proximity thereto. At the opposite extremity of the standing part the eye 4 is formed preferably in a plane at ninety degrees divergence from that of the eye 3 in order that the joining of the several links through said eyes will admit of and cause the links to all assume the same relative position along the line.

The wire forming the eye 4 after being turned over the standing part at 6 is extended downwardly as at 7 in substantially right angularly relation and is continued in a rounded portion 8 and an angular portion 9 directed towards the standing part and the opposite end of the link to form a loop 10 whereby the edges of the clothes to be supported on the line may be entered for securement thereto. From the inclined portion 9 the wire is extended at 11 in close parallel relation along the standing part for a desired distance whereat the wire is coiled about the standing part, as at 12, to anchor the wire thereto and form a rigid terminus for the resilient clothes-retaining element comprised of the parts forming the clothes-entering loop and the clothes-pinching portion 11, said form of construction providing efficient spring pressure to the pinching jaws to secure the fabric therebetween. The open loop 10 serves the dual purpose of furthering the entering and guiding of the cloth into the pinching jaws and of affording a degree of yielding spring pressure that will readily admit of the jaws being opened to receive the fabric and then close thereon with a firm grip.

A second cloth-receiving loop is formed by the further extension of the wire forming the coil 12 which extends along in parallel with the standing part 2 in the same manner as described with reference to the first mentioned clothes-pinching device and of which the several portions bear in the drawings corresponding reference numerals.

Said second cloth-retaining device terminates in a coil 13 formed about the standing part and its extremity 14, which is the opposite end of the wire forming the entire link, is directed in a relatively short length along the standing part in parallel therewith and in co-axial relation to the end portion 5 from which it is separated by a slight gap 15.

With the two ends of the wire, 5 and 14, in the described end-to-end and nearly abutting relation and in close parallel with the standing-part, such elements are firmly united and secured by flowing therebetween, that is to say, between the standing part 2 and said wire-ends and into the gap 15, a fused metal brazing or soldering compound, shown at 16, which when cooled will rigidly connect the parts together and form a smooth joint of great tenacity and efficiency.

It will thus be seen that the two ends of the wire forming the several links are completely anchored to the standing part and to each other in such manner that the full tensile strength of the wire forming the standing parts will be available in support of the load the line will be caused to bear, and particularly that the ends of the wire are shielded and secured to safeguard the clothes suspended on the line against tearing or injury from projecting points. In all other pinless clotheslines known to me the ends of the wire are liable to protrude and endanger the fabrics suspended thereon, particularly after continued use when the strains and swaying action undergone by the line causes the usually coiled wire-ends to straighten and extend outwardly in projecting points from which the clothes are apt to be torn. The alignment of the wire ends in my improved line and their embedment in a smooth mass of fluxed material entirely obviates the working loose or outward displacement of the wire-ends and presents at all times an even and unbroken surface upon which the fabric cannot be damaged.

In operation, the several links 1 are joined together in a chain, as seen in Fig. 1, through the interlocking engagement of the eye 3 of each link with the eye 4 of the adjoining link to form as long a line as required. When stretched between two rigid supports from its opposite ends it is ready for use to sustain clothes for drying without accessory devices for securing the clothes thereon. The fabric, indicated at 17 in Fig. 1, is entered at one of its corners within the loop 10 and then drawn laterally between the pinching jaws comprising the standing part 2 and the resilient portion 11. An adjacent corner or a fold taken in the middle of the fabric being hung may then be inserted in the next adjacent loop or any other convenient one along the line and be drawn into its cooperating jaws and so on until the line is filled.

An additional advantage in my present invention is found in the ease and convenience with which the link elements may be joined in assembling the line. With the links formed in the manner described excepting for the last step of soldering the ends 5 and 14, the end 5 may be threaded through the eye 4 of another link and into the eye 3 whereupon the ends may be soldered. The other links are connected in the same way until the chain is completed whereupon the links are permanently joined and can be folded at their jointed ends to make a compact and convenient bundle to be stored away when not in use.

Having described my invention, what I claim is:

A clothes-line consisting of a plurality of connected wire links, each said link having an eye formed at one extremity of said wire terminating in a short straight portion, said wire extending from said eye in a standing part having a second eye at its opposite end, a portion of said wire doubled back from said second named eye along said standing part and formed to provide a pair of clothes-attaching devices, the extremity of said doubled back portion terminating in a short straight portion disposed in co-axial relation to said first named straight and short portion and lying parallel to said standing part, and a body of fused metal connecting said short straight portions with said standing part.

WALTER I. RUYLE.

REFERENCES CITED

The following references are of record in the file of this patent:

UNITED STATES PATENTS

| Number | Name | Date |
|---|---|---|
| 416,854 | Percival | Dec. 10, 1889 |
| 430,170 | Brown | June 17, 1890 |
| 566,711 | Cooper | Aug. 25, 1896 |
| 988,006 | Martin | Mar. 28, 1911 |
| 1,607,508 | Bottrill | Nov. 16, 1926 |
| 1,826,064 | Fulton | Oct. 6, 1931 |
| 1,882,126 | Eldridge | Oct. 11, 1932 |